United States Patent
Chmaytelli et al.

(10) Patent No.: US 7,113,772 B2
(45) Date of Patent: Sep. 26, 2006

(54) WIRELESS COMMUNICATIONS SERVICES PAY PLAN CUSTOMIZER AND NOTIFIER

(75) Inventors: Mazen Chmaytelli, San Diego, CA (US); Samir K. Khazaka, San Diego, CA (US)

(73) Assignee: QUALCOMM Inc., San Diego, CA (US)

( * ) Notice: Subject to any disclaimer, the term of this patent is extended or adjusted under 35 U.S.C. 154(b) by 267 days.

(21) Appl. No.: 10/659,830

(22) Filed: Sep. 10, 2003

(65) Prior Publication Data

US 2005/0054324 A1    Mar. 10, 2005

(51) Int. Cl.
*H04M 3/42* (2006.01)
*H04M 3/00* (2006.01)
*H04M 11/00* (2006.01)

(52) U.S. Cl. .............. 455/414.1; 455/405; 455/418
(58) Field of Classification Search ........... 455/412.1, 455/414.1, 517, 3.01, 3.03, 3.06, 418, 419, 455/405, 406; 463/39, 40, 41, 42
See application file for complete search history.

(56) References Cited

U.S. PATENT DOCUMENTS

| | | | | |
|---|---|---|---|---|
| 5,754,953 A * | 5/1998 | Briancon et al. | ........... | 455/418 |
| 5,826,185 A * | 10/1998 | Wise et al. | ........... | 455/405 |
| 5,854,978 A * | 12/1998 | Heidari | ........... | 455/418 |
| 6,014,561 A * | 1/2000 | Molne | ........... | 455/419 |
| 6,044,258 A * | 3/2000 | Abdella | ........... | 455/405 |
| 6,208,851 B1 * | 3/2001 | Hanson | ........... | 455/405 |
| 6,493,547 B1 * | 12/2002 | Raith | ........... | 455/405 |
| 6,532,282 B1 * | 3/2003 | Plush et al. | ........... | 379/114.03 |
| 6,556,817 B1 * | 4/2003 | Souissi et al. | ........... | 455/406 |
| 6,704,563 B1 * | 3/2004 | Senn et al. | ........... | 455/406 |
| 6,725,056 B1 * | 4/2004 | Moles et al. | ........... | 455/524 |
| 6,785,561 B1 * | 8/2004 | Kim | ........... | 455/566 |
| 6,846,238 B1 * | 1/2005 | Wells | ........... | 463/39 |
| 6,912,382 B1 * | 6/2005 | Fellenstein et al. | ........... | 455/405 |
| 6,970,692 B1 * | 11/2005 | Tysor | ........... | 455/405 |
| 2004/0148638 A1 * | 7/2004 | Weisman et al. | ........... | 725/115 |
| 2004/0181591 A1 * | 9/2004 | Yu et al. | ........... | 709/217 |
| 2004/0266392 A1 * | 12/2004 | Jiddou | ........... | 455/406 |

\* cited by examiner

*Primary Examiner*—Sonny Trinh
(74) *Attorney, Agent, or Firm*—Philip R. Wadsworth; Robert J. O'Connell

(57) ABSTRACT

A system, method, and program for tracking usage and reporting available resource information of a wireless communication device, such as a mobile telephone. A server, wireless device, or both, keeps a record of available resources for the wireless device. In one embodiment, a server receives a request for an application from the wireless device, enables the application, and tracks the time for which the application is enabled. After the application is stopped, the server adjusts the record of available resources to reflect the time consumed by the application and provides the updated available resource information to the wireless handset. The wireless device can assist in such monitoring of available resources, with either data storage, processing, or both.

43 Claims, 6 Drawing Sheets

|  | Available resource | Flag |
|---|---|---|
| Prime time minutes | 100 | 10 |
| Non-prime time minutes | 500 | 10 |
| Weekend minutes | 700 | 10 |
| Call duration | - | 10 |

Fig. 6

WIRELESS COMMUNICATIONS SERVICES PAY PLAN CUSTOMIZER AND NOTIFIER

BACKGROUND OF THE INVENTION

1. Field of the Invention

The present invention generally relates to wireless telecommunication. More specifically, the present invention relates to a system and method for providing information regarding the use of a wireless communication device and customization of a services plan for the wireless communication device.

2. Description of the Related Art

The competition in the wireless telecommunications market has increased as the technology advances and the wireless communications service becomes more affordable. In order to attract new subscribers and increase the market share, wireless service providers offer a variety of service plans that fit different needs. For example, for a salesperson who is on the road most of time, a service plan for a larger fee that offers a large number of free prime time minutes and free long distance may be more desirable. Yet, for a non-working person, a service plan for a lower fee with a small number of free prime time minutes and a larger number of free weekend minutes may be more adequate.

When a user signs up for a wireless service provider, he may be offered a service plan with a specific allocation of air time minutes, such as prime time, evening or weekend minutes and, for a fixed price and when the user exceeds these limits, the user will be charged additionally. Though, the user has been informed of these limits, it is difficult for him to remember these limits and it is very difficult for him to know when his use is actively approaching these limits.

SUMMARY OF THE INVENTION

The invention is a system and method that address the above problems by tracking and informing a user about use of the wireless communications service. In one embodiment, the method is executed on a wireless device for tracking use of an application on the wireless device, wherein the wireless device is capable of communicating with a server through a wireless communication network. The wireless device receives subscription plan information for an application, and, in response to the subscription plan information received, establishes a subscription plan for a user, wherein the subscription plan includes available resource information. The wireless device receives a request for activating the application, and, in response to the request for activation, activates the application. After activating the application, the wireless device adjusts the available resource information to reflect the activation of the application, and displays the available resource information to the user.

The application can be a wireless communications application or an interactive game application. Further, the user of an application can have the airtime measured in connection minutes or in a money amount.

In an alternative embodiment, the method is executed on a server tracking use of an application on a wireless device, wherein the wireless device is capable of communicating with a server through a wireless communication network. The server receives a subscription request for an application from a user, and, in response to the subscription request, the server establishes a subscription plan for the user, with the subscription plan including available resource information. The server receives a request for use of the application from the wireless device, adjusts the available resource information according to the use of the application, and transmits the available resource information to the wireless device.

The system can be implemented as a computing device capable of tracking use of an application and providing notification to a user, wherein the computing device being capable of communicating with a server through a wireless communication network. The computing device has a wireless transmitter module for communicating with the server and receiving the application from the server, a controller for executing the application, an user interface unit for receiving inputs from the user for controlling the application, a display unit for displaying the application to the user, a timing module for tracking the execution of the application, and available resource information registers for storing available resource information, wherein the controller updates the available resource information in the available resource information registers according to the execution of the application.

Other objects, advantages, and features of the present invention will become apparent after review of the hereinafter set forth in Brief Description of the Drawings, Detailed Description of the Invention, and the claims.

BRIEF DESCRIPTION OF THE DRAWINGS

FIG. 6 is an illustration of a resource tracking table resident on either a wireless computer device, a server, or both.

DETAILED DESCRIPTION OF THE INVENTION

In this description, the terms "communication device," "wireless device," "wireless telephone," "wireless communications device," and "wireless handset" are used interchangeably, and the term "application" as used herein is intended to encompass executable and nonexecutable software files, raw data, aggregated data, patches, and other code segments. Further, like numerals refer to like elements throughout the several views. With advent of $3^{rd}$ generation (3G) wireless communication technology, more bandwidth has become available for wireless communications, and handsets and wireless telecommunication devices, such as cellular telephones, pagers, personal digital assistants (PDAs) have increasing wireless capabilities.

Figure 1:
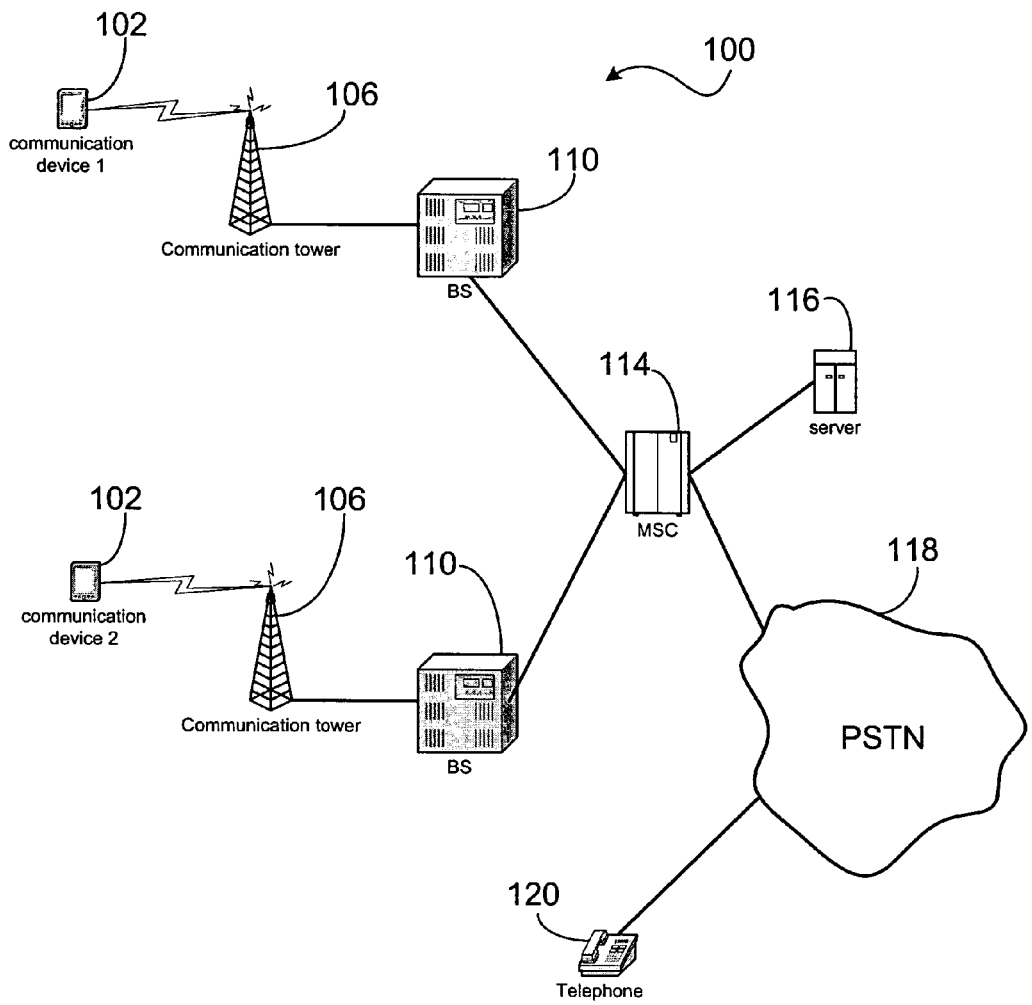
FIG. 1 illustrates a known architecture of a wireless network.

FIG. 1 depicts a prior art cellular telecommunication network 100. The communication network 100 includes one or more communication towers 106, each connected to a base station (BS) 110 and serving users with communication devices 102. The communication devices 102 can be cellular telephones, pagers, personal digital assistants (PDAs), laptop computers, or other hand-held, stationary, or portable communication devices that use a wireless and cellular telecommunication network. The commands and data input by each user are transmitted as digital data to a communication tower 106. The communication between a user using a communication device 102 and the communication tower 106 can be based on different technologies, such code division multiplexed access (CDMA), time division multiplexed access (TDMA), frequency division multiplexed access (FDMA), the global system for mobile communications (GSM), or other protocols that may be used in a wireless communications network or a data communications network. The data from each user is sent from the communication tower 106 to a base station (BS) 110, and forwarded to a mobile switching center (MSC) 114, which can be connected to a public switched telephone network (PSTN) 118.

The MSC 114 may be connected to a server 116 that supports different applications available to subscribers using the wireless communications devices 102. Optionally, the server 116 can be part of the MSC 114 or connected to the PSTN 118. The server 116 can be operated by the wireless service supplier or a third party. The server 116 stores a directory of telephone service subscribers. The wireless subscribers can be identified by mobile identification number (MIN) or the wireless device's electronic identification number (EIN).

When a user subscribes a wireless communications service from a service provider, the user selects a service plan that allocates certain free resources to him and the service provider stores the information about the service plan and the free resource information into the server 116. The user, when equipped with a wireless handset 102 according to the present invention, may download the service plan and the corresponding free resource information into the wireless handset 102. The user can also set up few personal settings on the wireless handset 102 that allow him to track use of the wireless handset 102.

Figure 2:
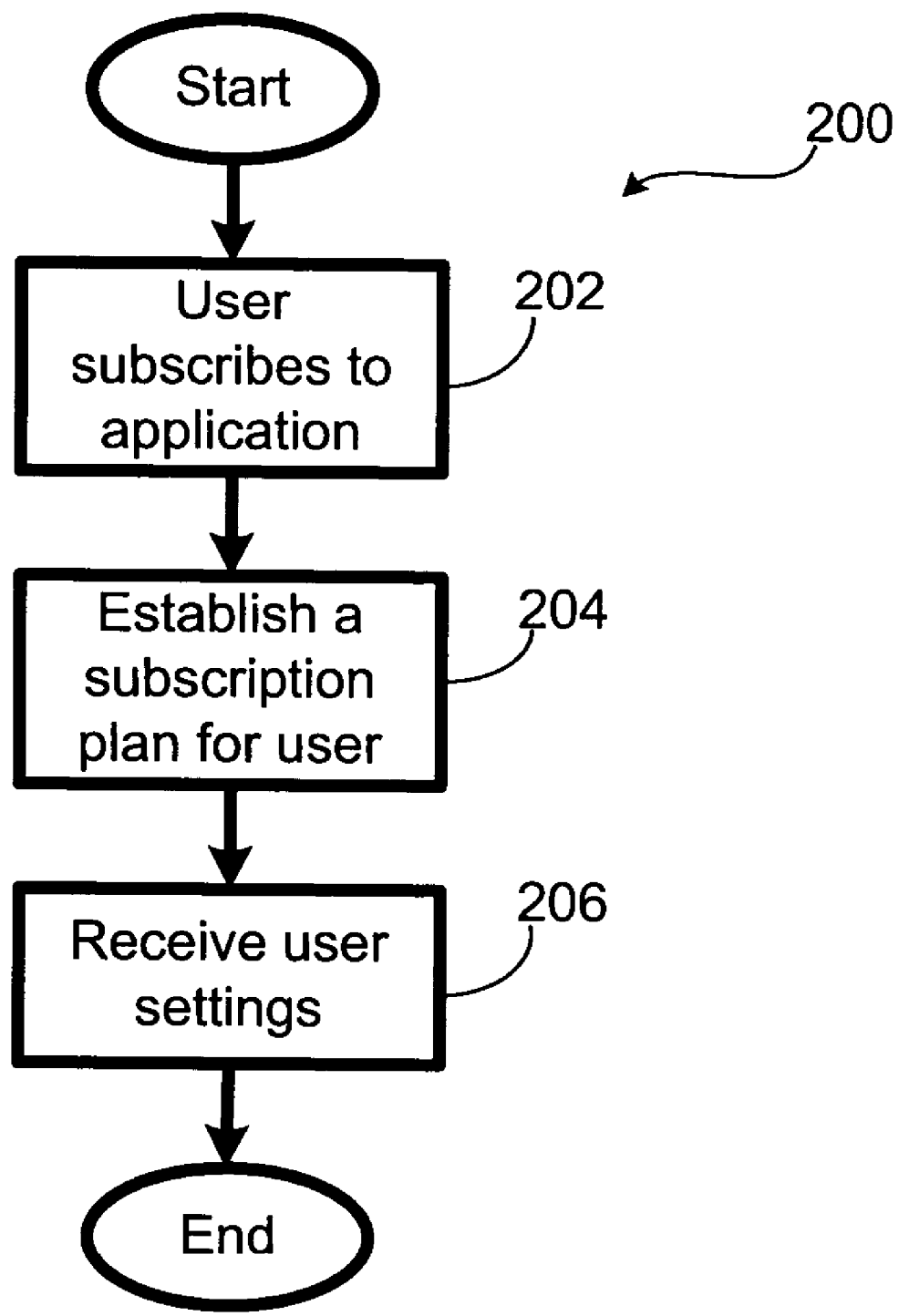
FIG. 2 is a flow chart for a subscription process executing at a server.

FIG. 2 illustrates this subscription process 200. The user subscribes to an application, step 202, that may be a wireless communications service or a game application, and a subscription plan is established for the user according to the user's selection, step 204. The user may also set up a few personal settings, such as when the user desires to be notified, step 206. If the user sets up a flag for a notification when the remaining prime time minutes is 10 minutes, the service provider will provide a notification when the prime time minutes left in the subscription plan is 10 minutes. The user may also set up a flag for when a certain individual call exceeds a preset duration. For example, if the user sets a flag for a five minutes call duration, every time a call exceeds five minutes, the user will receive a notification. The user may also set up a flag so he will receive a summary of remaining minutes in his subscription plan at the end of every call.

The usage tracking feature can be implemented on the wireless handset 102. The user enters a setting on the wireless handset 102 and the wireless handset 102 will track the usage. Every time the user receives a call or places a call, the wireless handset 102 records the duration of the call and deducts it from the available resource. If the call is made during the weekend, then the duration of the call is deducted from the weekend minutes. Alternatively, if the subscription plan is created by the service provider and stored in the server 116, the user can request download a copy of the service plan into his wireless handset 102, before tracking the use with the wireless handset 102.

In an alternative embodiment, the subscription plan may be established in terms of a money amount. For example, a user may have purchased $100.00 of air time from a service provider who charges a flat rate of five cents per minute. The subscription plan will record that there are $100.00 available of resource for the user. When the user places a call, the wireless handset records the cost of connection by adding five cents for each connection minute, and at the end of the call the cost of connection is deducted from the available resource.

Figure 3:
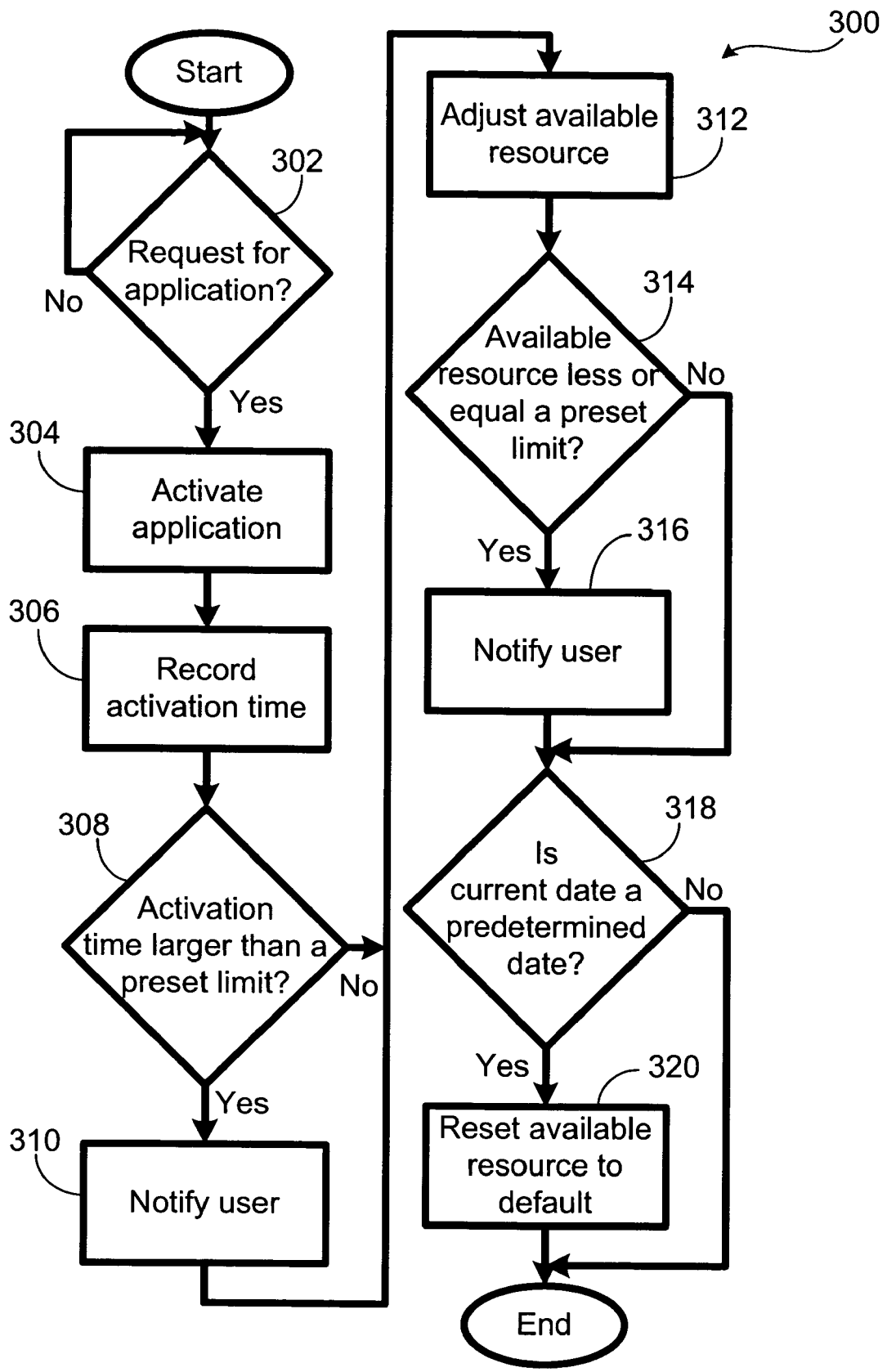
FIG. 3 is a flow chart for a usage tracking process executing at a wireless computer device.

FIG. 3 is a flow chart for a usage tracking process 300. The usage tracking process 300 can be implemented on the wireless device 102 or on the server 116. When executed on the wireless handset device 102, the request for an application, step 302, is received after the user enters a destination telephone number at the wireless handset 102, and the wireless handset 102 activates the application, step 304, by sending the destination telephone number to the server 116 and requesting a connection to the destination telephone number. The wireless device 102 receives the available resource information either downloading from the server 116 or entered manually by the user. The flags are also entered by the user and stored in the wireless handset without being transmitted to the server.

The wireless device 102 tracks the activation time, step 306, compares the activation time with a preset limit, step 308, and notifies the user, step 310, if the activation time is larger than the preset limit, by displaying a message on a display screen on the wireless device 102. After checking for the activation time, the wireless handset 102 adjust the available resource information to reflect the duration of the call, i.e., the wireless handset 102 deducts the duration of the call from the available resource information, step 312. The wireless handset also tracks the accumulate usage time by adding the activation time to the total of accumulated usage time. For example, if the call lasted 10 minutes during the prime time and the user had 190 prime time minutes of the available resource and 34 minutes of accumulated prime time usage, the wireless handset 102 will deduct the 10 minutes from the 190 minutes and add 10 minutes to the 34 minutes. The new available resource will then be 180 prime time minutes and the new accumulated usage prime time would be 44 minutes.

The wireless handset 102 will check the adjusted available resource against preset limits, step 314. If the adjusted available resource consists of 80 prime-time minutes, 150 non-prime time minutes, and 230 weekend minutes, the wireless handset 102 checks these numbers against the corresponding flags (preset limits) set by the user. If an available resource is less or equal than a preset limit, then the wireless handset 102 notifies the user, step 316. The notification can be a display message or an audio message.

The wireless handset 102 also checks whether it is time to reset the available resource to a default value. An example is that the wireless handset 102 will reset the available resource to a default value at the beginning of each billing period. The wireless handset 102 first determines whether the current date is the beginning of a billing period, step 318, if so, the wireless handset 102 resets the available resource to the default value, step 320.

When it is implemented on the server 116 has steps similar to the ones executed on the server 116. The server 116 checks whether it has received a request for an application, step 302, e. g., a request to connect to a destination telephone. If the request is received, the server 116 activates the application, step 304, by connecting the wireless handset 102 to a destination telephone, which may be another wireless telephone 102 or a wireline telephone 120. After the connection is established, the server 116 records the activation time, step 36, i.e., the duration of the call between the user and the destination telephone.

After the call is completed, the server 116 compares the activation time with a limit set by the user, step 308. If the activation time is greater than the preset limit, the server 116 sends a notice to the user, step 310. The notice can be a message to the wireless device 102 or an audio message played after the end of the connection. The steps 312–320 can be substantially the same as described above for when the usage tracking process 300 is executed on the wireless handset 102.

Figure 4:
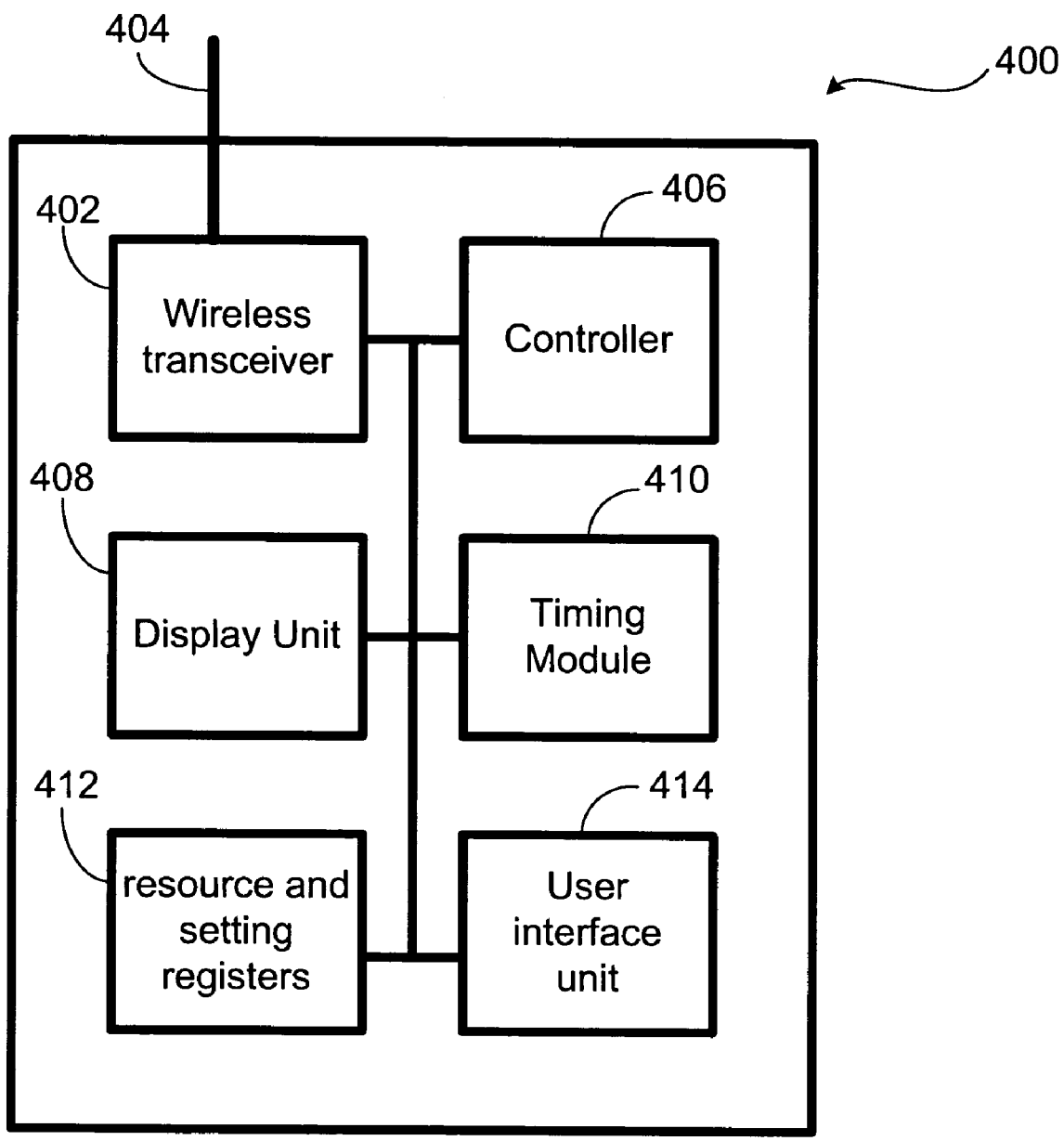
FIG. 4 is a block diagram for a wireless device platform.

FIG. 4 is a block diagram 400 of the platform of a wireless handset 102. The wireless handset 102, besides being capable of supporting wireless communications applications, is capable of tracking use of specific applications and providing notifications to the user when certain user settable parameters have been achieved or surpassed. The wireless handset 102 includes a wireless transceiver 402 connected to an antenna 404, a controller 406, a display unit 408, a timing module 410, resource and setting registers 412, and a user interface unit 414. The wireless handset 102 communicates with a wireless network via radio transmissions through the wireless transceiver 402. The wireless handset 102 receives user settings through the user interface unit 414, which may include a keypad, a speaker, a microphone, or other suitable input devices. After the user settings are received, they are saved in the resource and setting registers 412. The settings are transmitted to the server if the server tracks controls the usage tracking and notification operations. The resource and setting registers 412 may be part of a computer readable memory accessible by the controller 406. The available resource information is also stored in the resource and setting registers 412, and the controller 406 may update the resource and setting registers 412 according to the usage information. The timing module 410 is essentially a timer that the controller 406 can set up to track the usage information. The display unit 408 may be a liquid crystal display (LCD) screen or a plasma based display screen.

The wireless handset 102 is also capable of archiving, retrieving, and viewing summaries of previous activities at the device. At the beginning of each billing period, before resetting the available resources to their default value, the wireless handset 102 archives the usage information that has been recorded. The usage information, such as number of prime time, non-prime time, and weekend minutes used, is stored and available for later retrieval and review. The archiving can occur at pre-determined intervals, such as every 7 days. Alternatively, the archiving of files can occur after another event, such as the threshold of available minutes being met or like activity.

Figure 5:
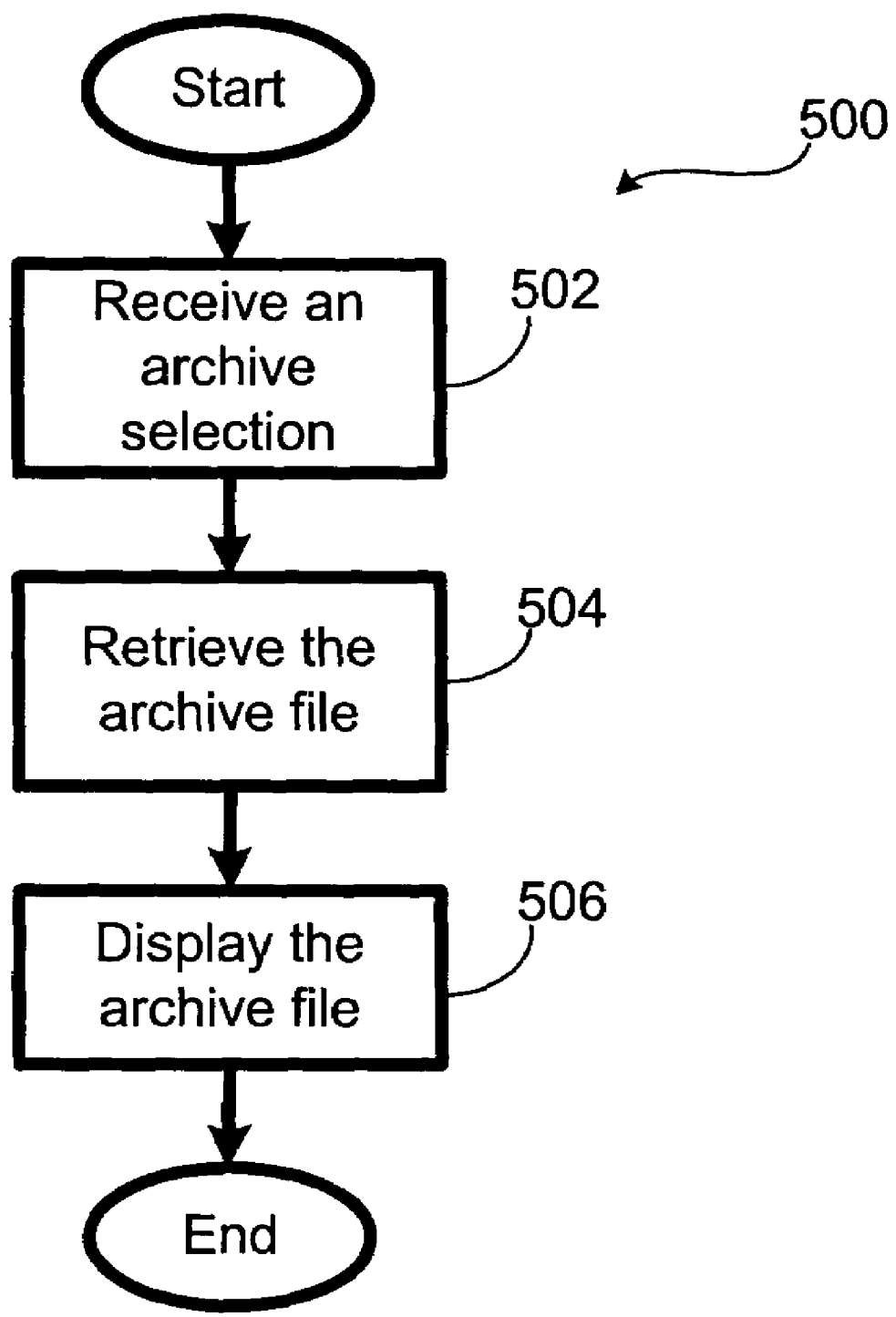
FIG. 5 is an archived file retrieval process.

FIG. 5 is a retrieval process 500 of data at the wireless handset 102. When the user wants to review the usage of an application in a particular month, the user can enter his selection at the wireless handset 102. The wireless handset 102 receives a selection for an archived usage file, step 502, and retrieves the archived file, step 504. After retrieving the archived file, the wireless handset 102 displays it to the user, step 506.

The archiving of usage information can also be done in the server 116. The user will enter his selection of an archived file on the wireless handset 102, and the wireless handset 102 sends the requests to the server 116. The server 116 retrieves the archived file and transmits it to the wireless handset 102. The wireless handset 102 then displays it to the user.

FIG. 6 illustrates a resource tracking table 600 that may be stored in the resource and setting registers 412 or in other accessible media. The resource tracking table 600 stores available resource information 602 for different resources, such as prime time minutes 604, non-prime time minutes 606, and weekend minutes 608. It also stores user settable flags (preset limits) 610 for different resources, including for the call duration 612.

The available resource information 602 for each resource may be updated after each call. For example, if a call lasted 15 minutes, where 9 minutes were made during the prime time hours and 6 minutes were made during non-prime time hours, then 9 minutes is deducted from the prime time minutes 604 and 6 minutes are deducted from the non-prime time minutes 606. For the table shown in FIG. 6, where a flag is set for 10 minutes for the call duration 612, a notification is provided to the user.

It should be noted that the system is not limited to communications applications, and can be applied to any application that runs on a remote wireless device and requires a subscription. The following is a description of a use scenario, where the user requests an interactive game from a server. The user subscribes to the interactive games from the service provider and chooses a subscription plan that affords him 100 prime time minutes, 500 non-prime time minutes, and 700 weekend minutes. After subscribing to the service plan, the user proceeds to set up flags for each individual resource, so he can receive notification when, for example, he plays a game more than 10 minutes continuously or exceeds 10 minutes in each resource category. FIG. 6 is an example of the user's subscription plan and settings. The information of FIG. 6 can be stored on user's wireless handset 102 or on the service provider's server 116. The user can change the settings by using his wireless handset 102 or through an Internet web access.

After subscribing to the service and setting up his preferences, the user may use the wireless handset 102 to request an interactive game that he can play against others online users. The user makes a request to the server 116 for a menu of games, and the request is transmitted wirelessly to a communication tower 106, passes through a base station 110 and a messaging switching center 114, and delivered to the server 116. The server 116 sends the menu to the wireless device 102.

After receiving the menu, the user activates the application by selecting an application. The activation request is received by the server 116, and the server 116 enables the user to become a player in a multi-user interactive game. The server 116 also starts a timer to record the user's play time. When the user is finished playing the game, the server 116 deducts the playing time from the user's subscription plan and sends the call duration and the available resource information to the user's wireless handset 102. The wireless handset 102 stores the available resource information received from the server 116 in the resource and setting registers 412 and compares the call duration with the flags in the resource and setting registers 412. If the call duration exceeds any of the flags, the wireless handset 102 displays a corresponding notification to the user.

In view of the method being executable on a wireless service provider's computer device or a wireless communications device, the system can be implemented with a program resident in a computer readable medium, where the program directs a wireless computer device having a computer platform to perform the steps of the method. The computer readable medium can be the memory of the device, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of the invention, the method may be implemented, for example, by operating portion(s) of the wireless network to execute a sequence of machine-readable instructions, such as the wireless communications device or the server. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated.

What is claimed is:

1. A method for tracking use of an application on a wireless device capable of communicating with a server through a wireless communication network, comprising the steps of:
   receiving a subscription request for the application from a user;
   in response to the subscription request, establishing a subscription plan for the user, wherein the subscription plan includes available resource information;
   receiving a request for use of the application from the wireless device;
   adjusting the available resource information according to the use of the application; and
   after said adjusting, transmitting the available resource information to the wireless device.

2. The method of claim 1, wherein the application is a wireless communication application and the step of receiving a request for use of an application from the wireless device comprises the steps of:
   receiving a connection request to a destination telephone number from the wireless device;
   connecting the wireless device to the destination telephone; and
   recording a connection time for a duration of the wireless device being connected to the destination telephone.

3. The method of claim 2, wherein the application is a wireless communication application and the step of adjusting the available resource information according to the use of the application comprises the step of subtracting the connection time from the available resource information.

4. The method of claim 2, further comprising the steps of:
   receiving a second setting for a second threshold from the wireless device;
   comparing the connection time against the second setting; and
   if the connection time is larger than or equal to the second setting, providing a notification to the wireless device.

5. The method of claim 4, wherein the second setting is a time period.

6. The method of claim 4, wherein the second setting is a money amount.

7. The method of claim 1, wherein the application is a game application and the step of receiving a request for use of an application from the wireless device comprises the steps of:
   receiving a connection request to a selected game from the wireless device;
   connecting the wireless device to the selected game; and
   recording a connection time for a duration of the wireless device being connected to the selected game.

8. The method of claim 7, wherein the step of adjusting the available resource information according to the use of the application comprises the step of subtracting the connection time from the available resource information.

9. The method of claim 1, further comprising the steps of:
   receiving a first setting for a first threshold from the wireless device;
   comparing the available resource information against the first setting; and
   if the available resource information is less or equal the first setting, providing a notification to the wireless device.

10. The method of claim 9, wherein the first setting is a time period.

11. The method of claim 9, wherein the first setting is a money amount.

12. The method of claim 1, further comprising the steps of:
    comparing a current date with a predetermined date; and
    if the current data matches the predetermined date, resetting the available resource information to a default value.

13. The method of claim 1, further comprising the steps of:
    comparing a current date with a predetermined date; and
    if the current data matches the predetermined date, archiving a usage information.

14. A method for tracking use of an application on a wireless device capable of communicating with a server through a wireless communication network, comprising the steps of:
    receiving a subscription plan information for the application;
    in response to the subscription plan information received, establishing a subscription plan for a user, wherein the subscription plan includes an available resource information;
    receiving a request for activating the application;
    in response to the request for activation, activating the application;
    in response to activating the application, adjusting the available resource information to reflect the activation of the application; and
    after said adjusting, displaying the available resource information to the user.

15. The method of claim 14, wherein the step of receiving a subscription plan information comprises the steps of:
    connecting to the server; and
    receiving the subscription plan information from the server.

16. The method of claim 14, wherein the step of receiving a subscription plan information comprises the step of receiving the subscription plan information from the user.

17. The method of claim 14, wherein the application is a wireless communication application and the step of receiving a request for activating the application comprises the step of receiving a destination telephone number.

18. The method of claim 17, wherein the step of activating the application comprises the steps of:
connecting the wireless device to the server; and
requesting the wireless device to be connected to a device associated with the destination telephone number.

19. The method of claim 18, wherein the step of adjusting the available resource information to reflect the activation of the application comprises the steps of:
recording a connection time for a duration of the wireless device being connected to the device associated with the destination telephone number; and
subtracting the connection time from the available resource information.

20. The method of claim 14, wherein the application is a game application and the step of receiving a request for activating the application comprises the step of receiving a request for a selected game.

21. The method of claim 20, wherein the step of activating the application comprises the step of requesting the wireless device to be connected to the selected game.

22. The method of claim 21, wherein the step of adjusting the available resource information to reflect the activation of the application comprises the steps of:
recording a connection time for a duration of the wireless device being connected to the selected game; and
subtracting the connection time from the available resource information.

23. The method of claim 14 further comprising the steps of:
receiving a first setting for a first threshold;
comparing the available resource information against the first setting; and
if the available resource information is less than or equal to the first setting, providing a notification to the user.

24. The method of claim 23, wherein the first setting is a time period.

25. The method of claim 23, wherein the first setting is a money amount.

26. The method of claim 14, further comprising the steps of:
receiving a second setting for a second threshold;
comparing the connection time against the second setting; and
if the connection time is greater than or equal to the second setting, providing a notification to the user.

27. The method of claim 26 wherein the second setting is a time period.

28. The method of claim 26, wherein the second setting is a money amount.

29. The method of claim 14, further comprising the steps of:
comparing a current date with a predetermined date; and
if the current data matches the predetermined date, resetting the available resource information to a default value.

30. The method of claim 14, further comprising the steps of:
comparing a current date with a predetermined date; and
if the current data matches the predetermined date, archiving a usage information.

31. A computer readable medium on which is stored a computer program for receiving a custom data from a server via a wireless communication network and storing the custom data in a predetermined directory in a computing device, the computer program comprising instructions, which when executed by a computing device performs the steps of:
receiving a subscription information for an application;
in response to receiving the subscription information, establishing a subscription plan, wherein the subscription plan includes an available resource information;
receiving a request for use of an application from a user;
adjusting the available resource information according to the use of the application; and
after said adjusting, displaying the available resource information to the user.

32. The computer program of claim 31, wherein the application is a wireless communication application and the step of receiving a request for use of an application from the user comprises the steps of:
receiving a connection request to a destination telephone number from the user;
connecting a computing device to the destination telephone number; and
recording a connection time for a duration of the computing device being connected to the destination telephone number.

33. The computer program of claim 32, wherein the step of adjusting the available resource information according to the use of the application comprises the step of subtracting the connection time from the available resource information.

34. The computer program of claim 31, wherein the application is a game application and the step of receiving a request for use of an application from the user comprises the steps of:
receiving a connection request to a selected game from the user;
connecting a wireless device to the selected game; and
recording a connection time for a duration of the wireless device being connected to the selected game.

35. The computer program of claim 34, wherein the step of adjusting the available resource information according to the use of the application further comprises the step of subtracting the connection time from the available resource information.

36. The computer program of claim 31 further comprising the steps of:
receiving a first setting for a first threshold;
comparing the available resource information against the first setting; and
if the available resource information is less than or equal to the first setting, providing a notification to the user.

37. The computer program of claim 36, wherein the first setting is a time period.

38. The computer program of claim 36, wherein the first setting is a money amount.

39. The computer program of claim 31, further comprising the steps of:
receiving a second setting for a second threshold;
comparing the connection time against the second setting;
if the connection time is larger than or equal to the second setting, providing a notification to the user.

40. The computer program of claim 39, wherein the second setting is a time period.

41. The computer program of claim 39, wherein the second setting is a money amount.

42. The computer program of claim 31, further comprising the steps of:

comparing a current date with a predetermined date;
if the current data matches the predetermined date, resetting the available resource information to a default value.

43. The computer program of claim 31, further comprising the steps of:

comparing a current date with a predetermined date;
if the current data matches the predetermined date, archiving a usage information.

* * * * *